H. S. DICKINSON.
WHEEL ADJUSTING MECHANISM FOR AGRICULTURAL IMPLEMENTS.
APPLICATION FILED AUG. 9, 1917.
1,316,696.
Patented Sept. 23, 1919.
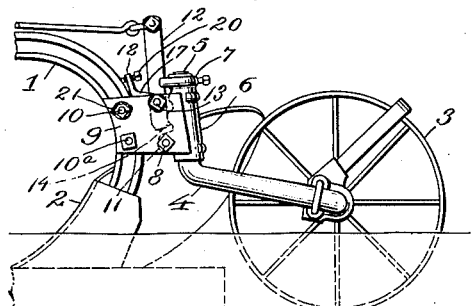
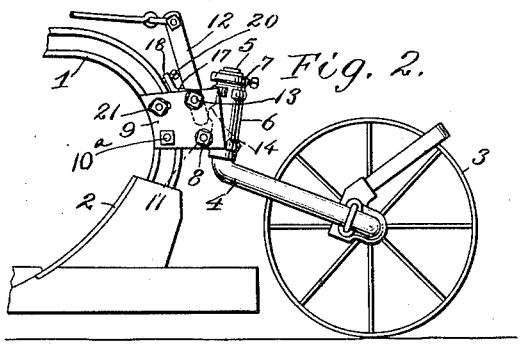
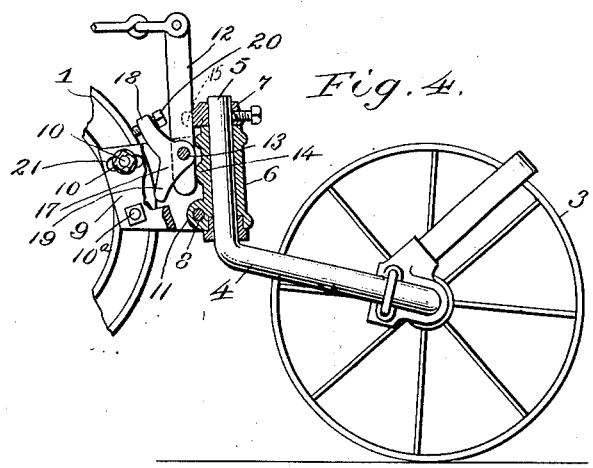
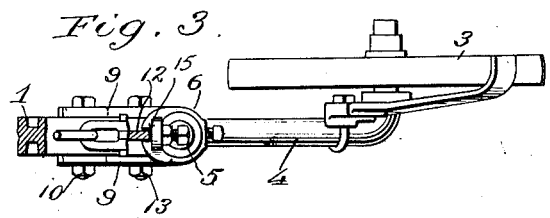
WITNESSES:
INVENTOR.
H. S. Dickinson
BY
Rogers, Kennedy Campbell
ATTORNEYS.

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

WHEEL-ADJUSTING MECHANISM FOR AGRICULTURAL IMPLEMENTS.

1,316,696.     Specification of Letters Patent.     Patented Sept. 23, 1919.

Original application filed August 12, 1915, Serial No. 45,095. Divided and this application filed August 9, 1917. Serial No. 185,254.

*To all whom it may concern:*

Be it known that I, HARRY S. DICKINSON, a citizen of the United States, residing at Moline, in the county of Rock Island and State of Illinois, have invented certain new and useful Improvements in Wheel-Adjusting Mechanism for Agricultural Implements, of which the following is a specification, reference being had therein to the accompanying drawing, being a division of original application filed August 12, 1915, Serial No. 45,095.

This invention relates to wheel plows and has reference more particularly to that type of plow in which the plow frame equipped with a plowing device or devices, is sustained by ground wheels movable up and down relatively to the frame to respectively lower and raise the plows.

My invention is concerned with the rear ground wheel supporting the rear end of the frame, which wheel is usually mounted on the frame so that it may swivel or caster to facilitate the turning of the machine when the plows are raised, and when the plows are in action the wheel travels in the furrow and is then usually locked against swiveling motion.

My invention consists of various improvements in the mounting of such wheel on the machine frame, by means of which improvements the wheel may be conveniently and easily raised or lowered to control the corresponding movements of the frame; the swiveling or castering movement of the wheel may be controlled so that when raised it will be locked, and when lowered to raise the plow it will be automatically released and permitted to swivel; and the relation of the wheel to the plow bottom may be permanently varied in order to control the degree of pressure that the wheel will sustain in supporting the plow. These several improvements will be fully described in the specification to follow, and the novel features thereof will be pointed out in the appended claims.

In the accompanying drawings:

Figure 1 is a side elevation of the rear end of a gang plow having my improved furrow wheel applied thereto, the wheel being shown in raised position to permit the plows to be lowered into action.

Fig. 2 is a similar view with the wheel lowered to raise the plow.

Fig. 3 is a top plan view of the same.

Fig. 4 is a longitudinal sectional elevation.

Referring to the drawings:

1 designates a plow beam forming the rear end of the machine frame, to which beam is attached a moldboard plow 2.

3 designates a ground or sustaining wheel for the rear end of the frame, which wheel acts in the present instance as a rear furrow wheel. The wheel is mounted on the horizontal laterally extending end of a wheel barrier or stem 4 which extends forwardly and then vertically upward in the form of a spindle 5. The spindle is mounted to swivel in an upright bearing sleeve or bracket 6, and has fixed to its upper end above the end of the sleeve, a collar 7. The bearing sleeve is mounted at its lower end to rock relatively to the frame on a horizontal transverse axis so that in its rocking motions, the wheel stem, and consequently the wheel mounted thereon, will be shifted up and down relatively to the machine frame. This axis is in the form of a horizontal transverse pivot bolt 8 passing through two rearwardly extending bracket plates 9 bolted by means of upper and lower bolts 10 and 10ª to the opposite sides of the plow beam, and through a lug 11 extending forwardly from the bearing sleeve between the plates.

12 designates an upright operating lever which is pivoted near its lower end by means of a horizontal transverse pivot bolt 13, between the two bracket plates in advance of the bearing sleeve, the lower end of the lever being in position to engage a lug 14 projecting forwardly from the bearing sleeve.

As a result of the construction described, when the frame is in lowered position and the plows down in action, the weight of the rear end of the frame acting on the pivotal connection of the bearing sleeve therewith, will tip the sleeve forwardly on its axis and by the engagement of the lug 14 with the lower end of the operating lever, the latter will be held in an upright position with the lever and sleeve engaging each other at a point above the axis of the lever and with its rear edge engaging in a notch 15 in the collar 7. In this position of the parts the wheel will be locked by the operating lever against swiveling action and will travel straight forward in the line of draft, and the sleeve engaging the lever at points on opposite sides of its axis, will be afforded a stop by said lever which will hold the sleeve against forward tipping motion on its axis and will thereby limit the depth of plowing. When now the operating lever is pulled forwardly, which may be conveniently effected by means of a cable attached thereto and extending within reach of the driver, the first part of the forward movement of the lever will disengage the same from the notch in the collar, and the further movement of the lever will cause its lower end to exert a rearward pressure on sleeve, which action will result in the rocking of the sleeve rearwardly on its pivotal axis, and the movement of the furrow wheel downwardly and a corresponding elevation of the rear end of the frame, the wheel in this position being free to caster, due to the disengagement of the lever from the notch in the collar 7.

From the construction described, it will be realized that when the wheel is in raised position with the plows in action, the wheel will be locked against swiveling or castering, but when the operating lever is actuated to lower the wheel and elevate the plows for transportation or turning at the ends of the furrows, the wheel will be automatically released and allowed to caster freely so that it will follow the path of travel of the machine in turning or at the ends of the furrows or in transportation, and will thus facilitate the proper guiding of the machine.

The feature of thus raising the rear end of the plow is of advantage and importance, in that in turning at the ends of the furrows or in transportation, the plow bottoms are lifted entirely clear of the ground, thus keeping them clear of trash and free of danger of usual obstructions. Also it has the advantage of relieving the wear on the heel of the land side, which would result if the plows were dragged around. The feature of automatically locking the rear wheel in the normal line of travel, when the plows are lowered in action, is of advantage in that it is often necessary when plowing, to back the blow up to clear an obstruction, or to remove trash from the bottoms and also to make adjustments or replacements. If, in these circumstances, the rear wheel were allowed to caster or swivel, there would be nothing to prevent it from moving out of the line of travel, or from moving sidewise into the furrow wall, or the plowed ground, thereby rendering liable, the breakage or damage of the parts.

In order that the relation of the furrow wheel to the plow bottoms may be permanently varied in the normal operation of plowing, so that the wheel may be caused to take greater or less pressure, I provide a member, in the present instance in the form of an elbow lever 17, formed with an upper arm 18 and a lower arm 19. This lever is situated between the bracket plates 9 before alluded to, and is pivotally mounted at the junction of its two arms, on the pivot bolt 70 of the operating lever. The lower arm of the elbow lever bears against the rear edge of the plow beam, while its upper arm is provided with an adjusting screw 20 which also bears against the rear edge of the plow beam but at a point above the axis of the elbow lever. The two bracket plates 9 fastened to the beam by the lower bolt 10ª extending through holes in the plates and beam, and the upper bolt 10 passing through arcuate slots 21 in the plates and a hole in the beam, are permitted, together with the furrow wheel sustained thereby, to be tipped up and down relatively to the beam on the axis of the lower bolt as a center. This tipping motion of the parts is effected and controlled by the adjusting screw 20 on the elbow lever, which being screwed up against the beam, after first loosening the bolts 21 and 22, will act to tip the plates and furrow wheel downwardly relatively to the beam, with the effect of causing the wheel to act with a greater degree of pressure on the ground. When the adjusting screw is turned in the opposite direction, the beam and plows are permitted to sink, thereby relieving the degree of pressure of the wheel on the ground. The bracket plates 9 constitute in effect a supporting device for the furrow wheel, which support is adjustable up and down relatively to the beam by the elbow lever 17, and in relation to which support, the furrow wheel is adjustable up and down by the operating lever 12 engaging the bearing sleeve 6.

Having thus described my invention, what I claim is:

1. In a wheeled plow, the combination of a frame adapted to carry a plowing device, a rear swiveling wheel carrier pivoted to the frame on a horizontal transverse axis and movable up and down relatively thereto, a lever pivoted to the frame and movable forwardly and backwardly to respectively lower and raise the wheel carrier, said lever acting when in its rear position to engage and lock the wheel carrier against swiveling action, and said lever operating when moved forwardly to release the wheel carrier, and means for moving the lever forwardly; whereby the supporting wheel will be locked against swiveling motion when the plows are down in action, and will be released and permitted to swivel when the plowing devices are raised.

2. In a wheeled plow, the combination of a frame, a bearing sleeve pivoted to the rear end of the frame on a horizontal transverse axis, a wheel carrier mounted in said sleeve and extending rearwardly therefrom and provided on its rear end with a ground wheel adapted in the pivotal action of the sleeve to move up and down relatively to the frame and lower and raise the same, and an operating lever pivoted between its ends to the frame on a horizontal transverse axis situated above and in advance of the axis of the sleeve, the lower end of the lever being engaged with the sleeve at a point above the axis of the latter, and the lever and sleeve being adapted to engage with each other at a point above the axis of the lever; whereby, when the plow is down in action with the ground wheel raised, the sleeve will be held engaged with the lever at opposite sides of the axis of the lever and will thereby limit the working depth of the plow, and when the upper end of the lever is pulled forwardly, the sleeve will be rocked rearwardly on its axis and the ground wheel lowered to elevate the plow.

3. In a wheeled plow, the combination of a frame, a wheel supporting device connected with the rear end of the frame and adjustable relatively thereto up and down, a rear supporting wheel sustained by said device, an adjusting lever pivoted to the supporting device and engaging the frame, and an adjusting screw on the lever engaging the frame at a point removed from the point of engagement of said lever with the frame.

4. In a wheeled plow, the combination of a frame, a wheel supporting device connected with the rear end of the frame and adjustable up and down relatively thereto, a lever engaging the frame and supporting device and operable to adjust the supporting device relatively to the frame, a ground wheel sustained by said supporting device, and a second lever sustained by the plow and coöperating with the ground wheel to move it up and down relatively to the supporting device.

5. In a wheeled plow, the combination of a frame, a wheel supporting device pivotally connected with the rear end of the frame for adjustment up and down relatively thereto, a bearing sleeve pivoted to the supporting device, a wheel carrying stem mounted in the bearing sleeve and carrying a ground wheel, an adjusting lever pivoted to the supporting device and engaging the frame to adjust the supporting device relatively to the frame, and an operating lever pivoted to the supporting device and engaging the bearing sleeve to adjust the wheel relatively to the supporting device.

6. In a plow, the combination of a plow-carrying frame, a sleeve bracket pivotally mounted on the frame on a horizontally disposed axis, a spindle journaled in said sleeve bracket so as to caster on an upright axis, a furrow wheel mounted on the lower end of the spindle, a lever pivoted on the frame and coöperable with the sleeve bracket so as to rock the same on its pivot by movement of the lever, and means connected with said spindle adapted to be brought into locking engagement with the lever to prevent rotative movement of the spindle in the sleeve bracket when the frame has been moved to lowered position.

7. In a plow, the combination of a plow-carrying frame, a furrow wheel, means connecting the furrow wheel to the frame so that the furrow wheel may caster about an upright axis and may be moved to raised and lowered position with respect to the frame, a lever mounted on the frame and coöperating with said means to effect movement of the wheel to said raised and lowered positions, and means operating between the lever and wheel-connecting means for automatically locking the wheel against castering when the wheel has been moved to raised position.

8. In a plow, the combination of a plow-carrying frame, a rear furrow wheel, an upright spindle upon the lower end of which the furrow wheel is mounted, means connecting the spindle to the frame in such manner as to permit the spindle to rock backwardly and forwardly on a horizontally disposed axis located intermediate its ends and to allow the wheel to caster about the longitudinal axis of the spindle, a lever pivoted on the frame and arranged to coöperate with said means for moving the spindle about said horizontal axis and means operable between the spindle and said lever for locking the spindle to prevent castering when the wheel has been raised with respect to the frame.

9. In a plow, the combination of a plow-carrying frame, an upright sleeve bracket pivotally mounted thereon so as to swing forwardly and backwardly with respect thereto, a spindle rotatably mounted in the bracket, a furrow wheel mounted on the lower end of the spindle, a lever pivoted intermediate its ends on the frame, the lever coöperating on one side of its pivot with the bracket to effect said swinging movement thereof by rocking of the lever, and means on the spindle for engaging the lever on the opposite side of its pivot to lock the spindle against rotation.

In testimony whereof, I have affixed my signature in presence of two witnesses.

HARRY S. DICKINSON.